(12) United States Patent
Dannebey et al.

(10) Patent No.: US 7,563,090 B2
(45) Date of Patent: Jul. 21, 2009

(54) MOLDING DEVICE WITH HEIGHT-ADJUSTABLE BASE FOR MOLDING THERMOPLASTIC CONTAINERS OF VARIOUS HEIGHTS

(75) Inventors: Laurent Dannebey, Octeville-sur-Mer (FR); Eric Canchel, Octeville-sur-Mer (FR); Marc Michelet, Octeville-sur-Mer (FR)

(73) Assignee: Sidel Participations, Octeville-sur-Mer (FR)

( * ) Notice: Subject to any disclaimer, the term of this patent is extended or adjusted under 35 U.S.C. 154(b) by 127 days.

(21) Appl. No.: 11/910,452

(22) PCT Filed: Mar. 29, 2006

(86) PCT No.: PCT/FR2006/000680

§ 371 (c)(1),
(2), (4) Date: Oct. 1, 2007

(87) PCT Pub. No.: WO2006/103344

PCT Pub. Date: Oct. 5, 2006

(65) Prior Publication Data

US 2008/0260884 A1 Oct. 23, 2008

(30) Foreign Application Priority Data

Apr. 1, 2005 (FR) .................................. 05 03240

(51) Int. Cl.
*B29C 49/48* (2006.01)
(52) U.S. Cl. .................. 425/195; 249/155; 425/522
(58) Field of Classification Search ............. 425/192 R, 425/195, 522; 249/102, 155
See application file for complete search history.

(56) References Cited

U.S. PATENT DOCUMENTS

| 765,365 | A | | 7/1904 | Lamp'l |
| 2,137,714 | A | * | 11/1938 | Dorman ........................ 65/360 |
| 4,815,960 | A | | 3/1989 | Rudolph |
| 6,428,302 | B1 | * | 8/2002 | Tsau ....................... 425/192 R |
| 6,736,629 | B1 | | 5/2004 | Derouault et al. |
| 7,258,538 | B2 | * | 8/2007 | Miller ......................... 425/182 |

FOREIGN PATENT DOCUMENTS

GB 1425638 A 2/1976

* cited by examiner

*Primary Examiner*—Robert B Davis
(74) *Attorney, Agent, or Firm*—Sughrue Mion, PLLC

(57) ABSTRACT

The invention concerns a molding device for making by blow molding or stretch blow molding thermoplastic containers capable of having different heights, comprising a module (1) with two mutually mobile half-molds (2A, 2B) and an axially mobile mold base (5); the mold base is supported by a support (22) with which are associated in operation means for axial displacement; the mold base, and its support (22) are secured by spacing means (24) with adjustable variable heights relative to the height of the molding cavity and provided in the form of threaded means with reverse-pitch double threading; the mold base can thus be positioned axially relative to the height of the molding cavity without modifying the support (22) and/or the displacement means which are operatively associated with it.

4 Claims, 4 Drawing Sheets

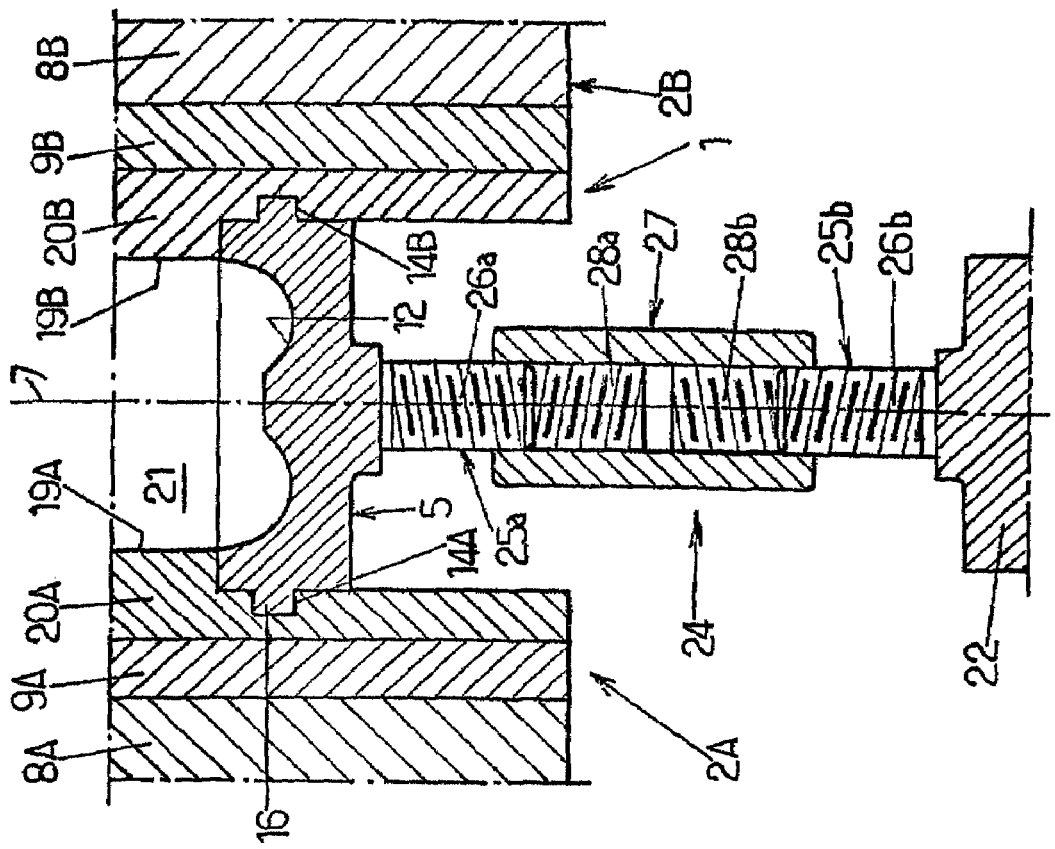
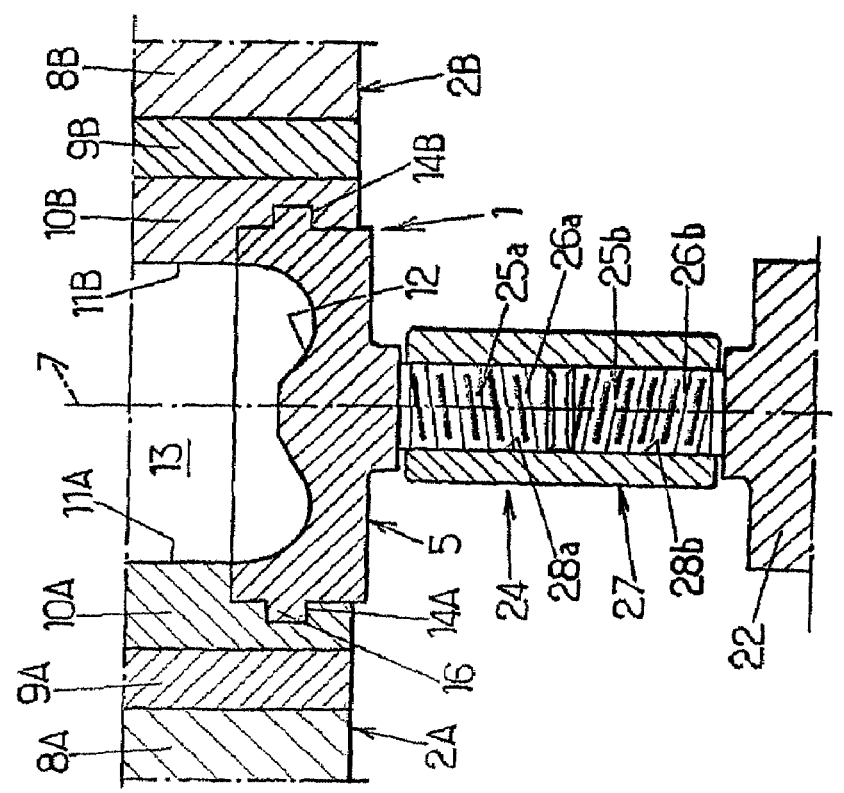
FIG.2B.
FIG.2A.

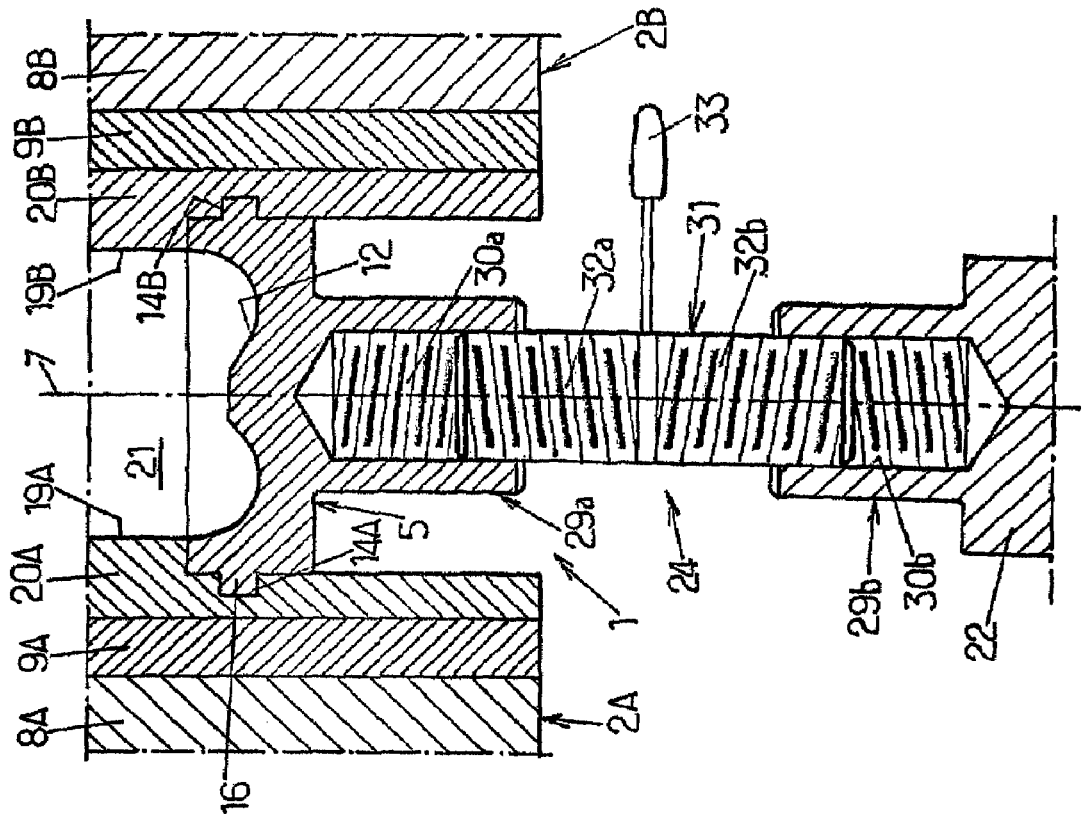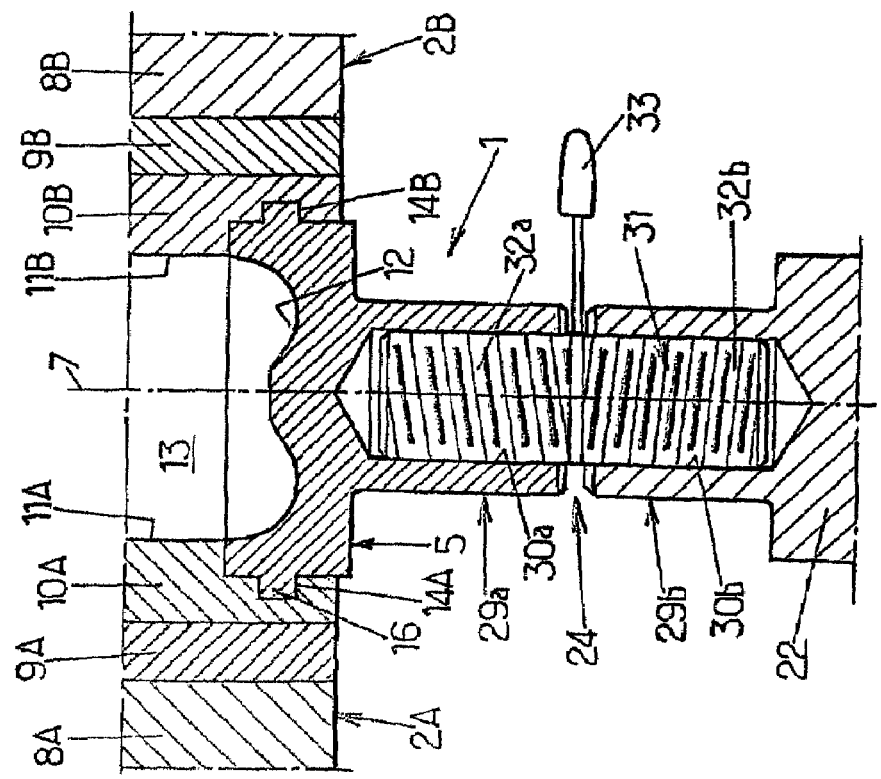

MOLDING DEVICE WITH HEIGHT-ADJUSTABLE BASE FOR MOLDING THERMOPLASTIC CONTAINERS OF VARIOUS HEIGHTS

CROSS REFERENCE TO RELATED APPLICATIONS

This application is a National Stage of International Application No. PCT/FR2006/000680, filed on Mar. 29, 2006, claiming priority based on French Patent Application No. 05 03240, filed Apr. 1, 2005, the contents of all of which are incorporated herein by reference in their entirety.

FIELD OF THE INVENTION

The present invention relates in general to the field of molding devices for manufacturing containers, particularly bottles, made of a thermoplastic such as PET by blow molding or stretch-blow molding, and it relates more particularly to improvements made to those of these molding devices that are designed to manufacture such containers, particularly such bottles, which are liable to have different heights, said molding devices comprising at least one mold which comprises two mold halves able to move relative to one another, particularly by rotation about a fixed common axle, and a mold base able to move relative to the two mold halves in axial translation, each mold half and the mold base comprising respective molding cavity portions which, when the mold is in the closed position, together define a molding cavity, the mold base being supported by a mold base support with which axial-movement means are functionally associated, the mold base and the mold base support being secured to one another via variable-height spacer means that can be adjusted in relation to the height of the molding cavity and which are made in the form of threaded means.

BACKGROUND OF THE INVENTION

It applies quite particularly, although not exclusively, to devices, like the one described in document FR 2 733 176, in which each mold half consists of a mold holder, of a shell holder fixed to the mold holder and of a shell supported by the shell holder, the cavity portions of each mold half being made in said shells. It of course applies to devices anterior to the one described in this document FR-2 733 176, that is to say to devices in which the mold holders do not support a shell holder to which a shell is fixed, but each support a one-piece component containing not only the cavity portion of the mold half, but also tubing for regulating the temperature of the mold.

Figure 1A:
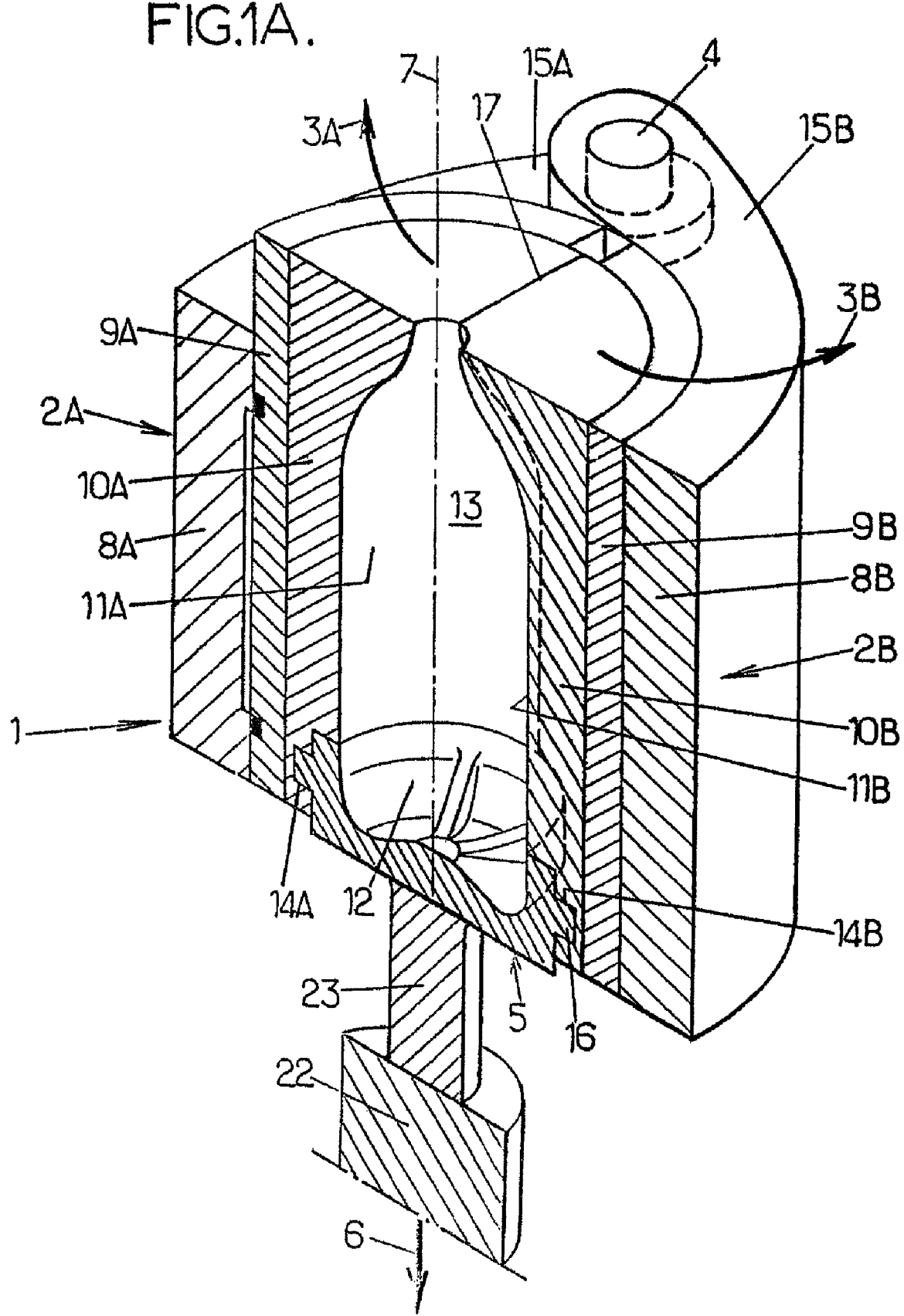

FIG. 1A schematically illustrates, in axial half section and in lateral perspective from above, a mold, denoted in its entirety by the reference 1, of a molding device as described and depicted for example in document FR-2 733 176, to which the invention can apply. The mold 1, of axis 7, comprises two mold halves 2A, 2B respectively, able to move one relative to the other, particularly in rotation (arrow 3A, 3B, respectively) about a fixed common axis 4, and a mold base 5 which can move with respect to the two mold halves 2A, 2B in axial translation coaxial to the axis 7 (arrow 6).

Each mold half 2A, 2B comprises a mold holder 8A, 8B, respectively, which is equipped with respective support arms 15A, 15B articulated to the aforementioned axle 4, a respective shell holder 9A, 9B fixed to the corresponding mold holder in any way known to those skilled in the art, and a respective shell 10A, 10B supported by respective shell holder 9A, 9B in any way known to those skilled in the art. The two shells 10A, 10B and the mold base 5 comprise respective molding cavity portions 11A, 11B and 12 which, when the mold is in the closed position, together define a molding cavity 13 which is coaxial with the axis 7 of the mold 1.

Along the collaborating respective peripheries of the half shells 10A, 10B and of the base 5, the half shells have respective grooves 14A, 14B and the base has a radially projecting peripheral rib 16 able to be housed in the grooves 14A, 14B when the mold 1 is in the closed position as illustrated in FIG. 1A, so that the half shells and the base form a mechanical assembly that is non-deformable under the blow-molding pressure (of the order of $40 \times 10^5$ Pa). Arrangements of this type are represented, for example, in documents FR-2 720 680, FR-2 828 829 and FR-2 841 495.

It will be noted that, in the depiction of FIG. 1A, the plane of section of the closed mold 1 is substantially diametral and substantially parallel to the parting line 17 of the shells 10A, 10B.

In the configuration illustrated in FIG. 1A, the cavity portions 11A, 11B of the shells 10A, 10B occupy substantially the entire height of said shells 10A, 10B, which have a height substantially equal to that of the respective shell holders 9A, 9B, which is the height of the mold 1. Thus, the molding cavity 13 therefore has the maximum permissible height for this mold and corresponds to the maximum height of the containers that can be manufactured using this mold (for example 2-liter bottles, as illustrated).

Figure 1B:
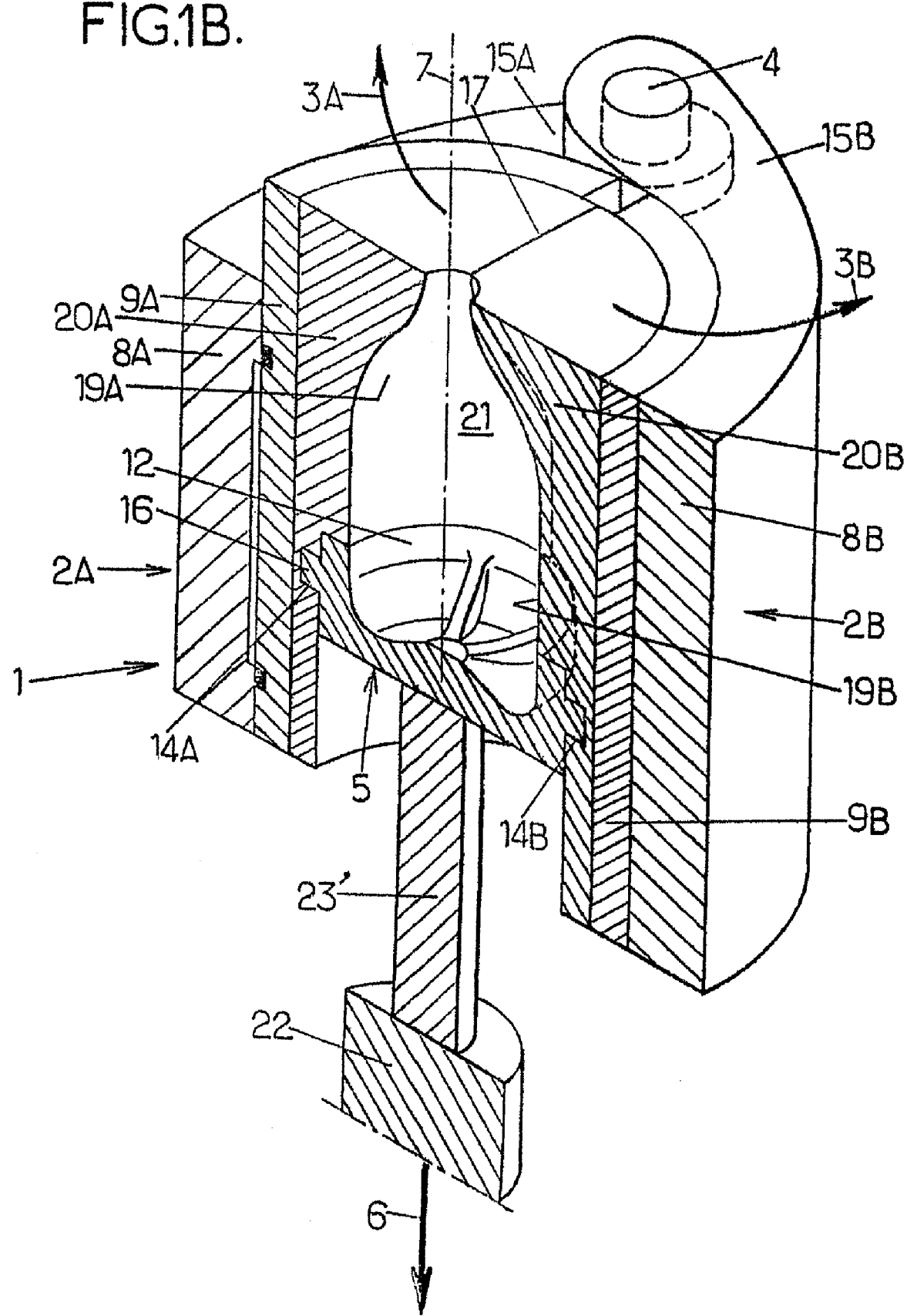

In order to increase the production capability of the mold, it is desirable for it to be able to be configured for manufacturing not only said maximum-height containers, but also containers of lesser heights (for example 1-liter bottles, 0.6-liter bottles, etc.) which do, however, all have the same base. To these ends, it is known practice for the shells 10A, 10B equipped with the respective molding cavity portions 11A, 11B to be replaced by shells 20A, 20B provided with different respective molding cavity portions 19A, 19B (in this instance, molding cavity portions that are not as tall), as shown in FIG. 1B. The cavity portions 19A and 19B and the cavity portion 12 in the base together, when the mold is in the closed position, define a molding cavity 21 which is not as tall as the cavity 13 in FIG. 1A. In practice, the molding cavity portions 19A, 19B are positioned in the upper part of the half shells 20A, 20B, which are positioned at the tops of the shell holders. Thus, the overall layout of the molding device is maintained, with the mold holders 8A, 8B and the shell holders 9A, 9B and the base 5 also, provided that the axial positioning of this base with respect to the shells is altered to suit the reduction in height of the molding cavity portions.

The mold base 5 is supported by a mold base support 22 with which movement means (not shown in FIGS. 1A and 1B) able to move the mold base 5 axially during the molding process are associated. The mold base 5 is secured to the mold base support 22 by a connecting member. In this configuration, appropriate positioning of the mold base 5 with respect to the height of the molding cavity can be obtained by altering the height of the connecting member by changing this member (using a short connecting member 23 for the maximum-height molding cavity 13 as shown in FIG. 1A; and using a long connecting member 23' for the molding cavity 21 of lesser height as shown in FIG. 1B) and/or by moving the mold base support 22 and the movement means associated with it.

These adjustments, however they are made, prove to be lengthy, restrictive and, ultimately, expensive. There is therefore, in practice, a pressing need to reduce or even eliminate these constraints.

Document U.S. Pat. No. 4,815,960 describes a molding device provided with a mold base the axial position of which can be adjusted by means of an axial threaded rod secured to the mold base by one of its ends. The threaded rod passes through an adjusting nut, supported such that it can turn freely by a fixed support, allowing the heightwise adjustment of the mold base. In this known arrangement, the adjusting nut is supported by means of a fixed bearing in which the nut is engaged and turns. The disadvantage with this solution lies in the fact that all the stresses that oppose the movement of the mold are borne at the interface between the rotary nut and the bearing: this results in wearing of the rubbing parts and a risk of the nut being torn out of the bearing.

So as to remedy to this problem, it could be provided to replace the rotary nut in said known structure with a fixed nut, particularly one secured to the frame, and then turn the threaded rod, the end of which would, on its transverse face, bear against the mold base. However, such an arrangement would in turn have a disadvantage which would be the wearing of the mold base in contact with the rotary transverse face of the threaded rod, or even possible deformation of the mold base resting against said small cross-section transverse face of the threaded rod.

SUMMARY OF THE INVENTION

It is an object of the invention to remedy the aforementioned disadvantages by proposing an improved structure that allows for quick and economical adjustment of the axial position of the mold base in relation to the height of the molding cavity.

To these ends, the invention proposes a molding device for manufacturing containers, particularly bottles, by blow molding or stretch-blow-molding a thermoplastic such as PET, and which are liable to have different heights, arranged as mentioned in the preamble, which devices, while being in accordance with the invention, is characterized in that the variable-height spacer means are threaded means having two screw threads of opposite hand secured to the mold base and to the mold base support.

By virtue of this arrangement, the mold base can be positioned axially in relation to the height of the molding cavity without changing the mold base support and/or the movement means functionally associated with it.

Because recourse is had to two screw threads of opposite hand, all the stresses to which the mold base is subjected are borne on the threads, and therefore over a large area, in other words, at a reduced pressure between the contacting parts, and therefore a lower wear rate. In addition, there are no parts rotating inside a bearing, thus eliminating friction and wear. There is no rotary contact between a transverse end of the threaded rod and the mold base, thus setting aside any possibility of wearing or deformation of this mold base. Finally, since the mold base can move axially only, there is no problem with indexing the angular position with respect to the mold.

In one possible exemplary embodiment, provision is made for the variable-height spacer means to comprise two substantially coaxial threaded rods which are secured to the mold base and to the mold base support respectively and which have respective screw threads of opposite hand, and a ring internally threaded with two screw threads of opposite hand and surrounding the aforementioned two threaded rods.

In a second possible exemplary embodiment, provision is made for the variable height spacer means to comprise two substantially coaxial threaded rings which are secured to the mold base and to the mold base support respectively and which have respective screw threads of opposite hand and a threaded rod with two external screw threads of opposite hand and which is engaged in the aforementioned two threaded rings.

BRIEF DESCRIPTION OF THE INVENTION

The invention will be better understood from reading the detailed description which follows of certain preferred embodiments which are given by way of purely illustrative examples. In this description, reference is made to the attached drawings in which:

FIGS. 1A and 1B are schematic views, in diametral section and in lateral perspective from above, of a mold of the prior art, discussed hereinabove and shown in two functionally different configurations, respectively;

FIGS. 2A and 2B are schematic partial views, in diametral section, of part of a first exemplary embodiment of a mold arranged according to the invention, shown in two different functional configurations, respectively; and FIGS. 3A and 3B are schematic partial views, in diametral section, of part of a second exemplary embodiment of a mold arranged according to the invention, shown in two different functional configurations, respectively.

DETAILED DESCRIPTION OF THE INVENTION

In the remainder of the description, the same numerical references as were used in FIGS. 1A and 1B will be kept for denoting components which are similar.

According to the object of the invention, provision is made for the rigid connection 23, 23' illustrated in FIGS. 1A and 1B between the mold base 5 and mold base support 22 to be replaced with variable-height spacer means 24 that can be adjusted in relation to the height of the molding cavity. Thus, the mold base 5 can be positioned axially in relation to the height of the molding cavity without changing the structure and/or the position of the mold base support 22 and/or of the movement means functionally associated with it.

The spacer means 24, of a purely mechanical type, in the form of threaded means so that their structure is simple and inexpensive to manufacture, to fit and to maintain, consist, according to the invention, of threaded means with two screw threads of opposite hand, secured to the mold base 5 and to the mold base support 22. Preferred practical embodiments of these arrangements will now be explained.

In FIGS. 2A and 2B, that part of the mold of FIGS. 1A and 1B to which the invention relates, it being arranged according to a first exemplary embodiment of these measures, is depicted by itself. In this first exemplary embodiment, the variable-height spacer means 24 comprise two substantially coaxial threaded rods 25a, 25b which are secured to the mold base 5 and to the mold base support 22 respectively and which have two respective screw threads 26a, 26b of opposite hand; Furthermore, a ring 27, internally threaded with two screw threads 28a, 28b of opposite hand, surrounds the aforementioned two threaded rods 25a, 25b. Because of the threaded means with two screw threads of opposite hand, any rotation of the ring 27 results in an axial movement of the mold base 5 (the mold base support 22 remaining stationary).

In FIG. 2A, the rotating of the ring 27 has brought the two threaded rods 25a, 25b as close together as possible so that the mold base 5 is in its lowest position corresponding to the maximum-height cavity 13, by virtue of the presence of shells 10A, 10B provided with suitable respective cavity portions 11A, 11B collaborating with the mold base.

In FIG. 2B, the ring 27 has been rotated to part the two threaded rods 25a, 25b as far as possible so that the mold base 5 is in its uppermost position corresponding to a minimum height cavity 21, by virtue of shells 20A, 20B provided with appropriate respective cavity portions 19A, 19B collaborating with the mold base.

In FIGS. 3A and 3B, that part of the mold of FIGS. 1A and 1B to which the invention relates, it being arranged according to a second exemplary embodiment of the aforementioned measures, is depicted by itself. In this second example, the variable-height spacer means 25 comprise two substantially coaxial internally threaded rings 29a, 29b which are secured to the mold base 5 and to the mold base support 22, respectively, and which have respective screw threads 30a, 30b of opposite hand; furthermore, a rod 31 externally threaded with two screw threads 32a, 32b of opposite hand, is engaged in the aforementioned two threaded rings 29a, 29b. Any rotation of the rod 31, for example via a handle 33 secured to it, results in an axial movement of the mold base 5 (the mold base support 22 remaining stationary).

In FIG. 3A, the turning of the rod 31 has brought the two threaded rings 29a, 29b as close together as possible so that the mold base 5 is in its lowermost position corresponding to the maximum-height cavity 13, by virtue of the presence of shells 10A, 10B provided with suitable respective cavity portions 11A, 11B collaborating with the mold base.

In FIG. 3B, the rotation of the rod 31 has moved the two threaded rings 29a, 29b as far apart as possible so that the mold base 5 is in its uppermost position corresponding to a minimum-height cavity 21, by virtue of the presence of shells 20A, 20B provided with suitable respective cavity portions 19A, 19B collaborating with the mold base.

The invention claimed is:

1. A molding device for manufacturing containers, particularly bottles, made of a thermoplastic such as PET by blow molding or stretch-blow-molding, and which are liable to have different heights, said molding device comprising at least one mold which comprises two mold halves able to move relative to one another and a mold base able to move relative to the two mold halves in axial translation, each mold half and the mold base comprising respective molding cavity portions which, when the mold is in the closed position, together define a molding cavity, the mold base being supported by a mold base support with which axial-movement means are functionally associated, the mold base and the mold base support being secured to one another via variable-height spacer means that can be adjusted in relation to the height of the molding cavity and which are made in the form of threaded means, wherein the variable-height spacer means are threaded means having two screw threads of opposite hand secured to the mold base and to the mold base support, whereby the mold base can be positioned axially in relation to the height of the molding cavity without changing the mold base support and/or the movement means functionally associated with it.

2. The molding device as claimed in claim 1, wherein the variable-height spacer means comprise substantially two coaxial threaded rods which are secured to the mold base and to the mold base support respectively and which have respective screw threads of opposite hand, and a ring internally threaded with two screw threads of opposite hand and surrounding said two threaded rods.

3. The molding device as claimed in claim 1, wherein the variable height spacer means comprise two substantially coaxial internally threaded rings which are secured to the mold base and to the mold base support respectively and which have respective screw threads of opposite hand and a threaded rod with two external screw threads of opposite hand and which is engaged in said two threaded rings.

4. The molding device as claimed in claim 1, wherein each mold half comprises a mold holder, a shell holder fixed to the mold holder and a shell supported by the shell holder, and wherein the two shells and the mold base comprise respective molding cavity portions which, when the mold is in the closed position, together define a molding cavity.

\* \* \* \* \*